UNITED STATES PATENT OFFICE.

ADRIEN GACON, OF MONTVAL, NEAR MARLY-LE-ROY, FRANCE.

PROCESS FOR THE MANUFACTURE OF ARTIFICIAL EMERY.

No. 820,859. Specification of Letters Patent. Patented May 15, 1906.

Application filed November 22, 1904. Serial No. 233,920.

*To all whom it may concern:*

Be it known that I, ADRIEN GACON, chemist-engineer, a citizen of the Republic of France, residing in Montval, near Marly-le-Roy, Seine-et-Oise, France, have invented a Process for the Manufacture of Artificial Emery, (for which I have deposed a French patent of addition October 31, 1904, not yet issued,) of which the following is a specification.

This invention has for its object a process for the manufacture of artificial emery by means of a mixture of bauxite, coke, nitrate of soda, and sawdust, which is ignited in a furnace of any appropriate kind.

By way of example the following may be given as the proportions to be employed and the practical details for the manipulation in the manufacture of a ton of artificial emery: seven hundred and sixty-nine kilograms of bauxite, five hundred and thirteen kilograms of coke, fifty kilograms of nitrate of soda, two hundred and fifty kilograms of sawdust.

It should, however, be understood that the proportions given above are not fixed and that it is possible to modify them in accordance with the quality of the substances employed. In any case the bauxite, which should preferably be ferruginous, the coke, and the nitrate of soda are pulverized, kneaded, and mixed together and with the sawdust. The mixture is effected under a jet of water in such a manner as to form a firm pasty mass. This mass is then subdivided into loaves or cakes of any desired form and volume adapted to be readily handled, these cakes being subsequently stacked in a furnace, which may be a grate-furnace provided with a draft produced by a chimney or by means of a blower.

The heat developed by the furnace produces in the mass a rapid and complete combustion. This combustion is rendered very intense and exceedingly homogeneous throughout every part of the mass, owing to the finely-divided condition of the combustible and particularly owing to the sawdust, which during its combustion rapidly creates in all directions circulation-passages through which the products of combustion pass readily. Under the influence of this combustion and also under the influence of the nitrate of soda, which acts as a flux, (which action it exerts in a very active manner,) the fusion of the bauxite is produced with great rapidity. It will be noted that the employment of this flux permits of carrying out the operation with a smaller amount of combustible.

The artificial emery obtained by means of this novel process is very hard and exceedingly vitrified. When crushed, pulverized, and suitably classed, this emery presents the greatest possible similarity with natural emeries and has all their good qualities, while its cost is far lower.

What I claim, and desire to secure by Letters Patent of the United States, is—

1. The process of manufacturing artificial emery consisting in mixing bauxite, coke and nitrate of soda, and igniting the said mixture, the nitrate of soda intervening actively so as to hasten the fusion and reduce the amount of combustible required to a minimum.

2. The process of manufacturing artificial emery consisting in mixing bauxite with a combustible, nitrate of soda, and a suitable quantity of sawdust, and forming a homogeneous pasty mass, molding the mass into loaves or cakes for the purpose of stoving in a suitable furnace and igniting the same.

3. The process of manufacturing artificial emery consisting in mixing bauxite, coke, nitrate of soda and sawdust with water, forming said mixture into blocks, stoving them, and finally crushing the product so obtained.

4. The process of manufacturing artificial emery consisting in mixing bauxite with a combustible and a flux, and adding sawdust and water to form a pasty mass, molding the mass into loaves, igniting the loaves in a furnace, and then crushing the product so obtained.

In testimony whereof I have signed my name to this specification in the presence of two subscribing witnesses.

ADRIEN GACON.

Witnesses:
 LEON FRAMKEN,
 JOHN BAKER.